April 29, 1969 L. JAGER 3,441,283
RECORDING AND/OR PLAY-BACK APPARATUS
Filed July 12, 1966 Sheet 1 of 2
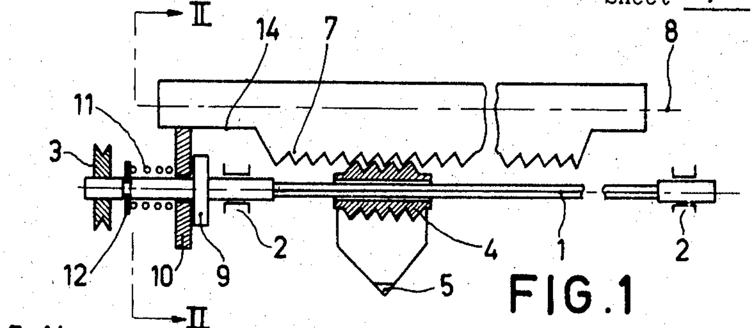
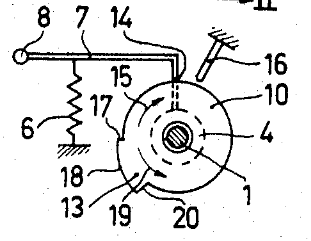
FIG. 2a
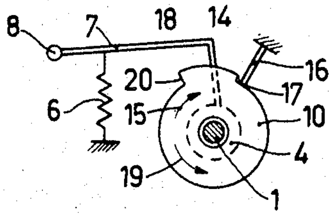
FIG. 2b
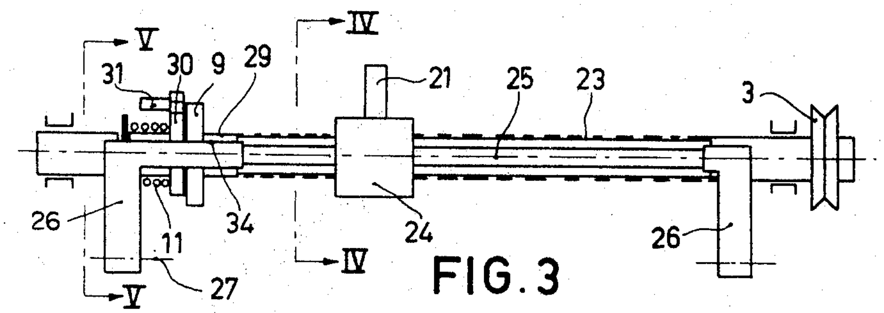
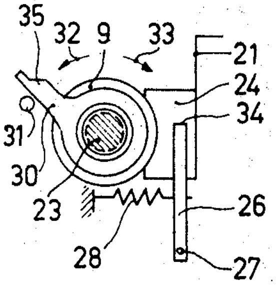
FIG. 5a
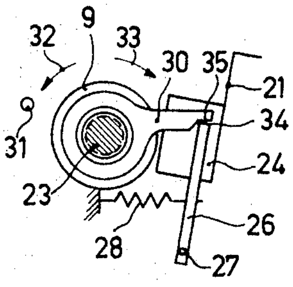
FIG. 5b
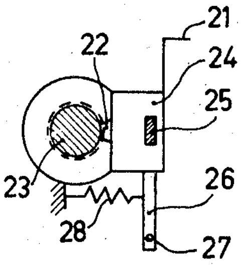
FIG. 4
INVENTOR.
LOTHAR JAGER
BY
[signature]
AGENT INVENTOR.
LOTHAR JAGER
BY
Frank R. Jifani
AGENT United States Patent Office 3,441,283
Patented Apr. 29, 1969

3,441,283
RECORDING AND/OR PLAY-BACK APPARATUS

Lothar Jager, Vienna, Austria, assignor to North American Philips Company, Inc., New York, N.Y., a corporation of Delaware Filed July 12, 1966, Ser. No. 564,676
Claims priority, application Austria, July 19, 1965, A 6,619/65
Int. Cl. G11b *25/06*
U.S. Cl. 274—11 5 Claims

ABSTRACT OF THE DISCLOSURE

A worm-drive operated index for a tape recorder which uses a cam, operated through a slip clutch to disengage the worm from the gear of the drive and to lock the drive in the disengaged position when the index reaches the limit of its motion.

The invention relates to recording and play-back apparatus suitable for recording on tape or wire of the type including an indicator apparatus for showing how much tape has been supplied from a storage reel or magazine and in particular to recording apparatus where a worm drive is provided for transmitting the rotational movement of a record carrier drive wheel to the index of the indicator. In such apparatus the parts of the drive are coupled by a spring and uncoupled by changing the position of the first part when the movement of the index is obstructed.

The use of a worm drive in which a part is arranged to be coupled and uncoupled with another part permits the apparatus to be designed so that the indicator is automatically reset to zero in certain cases, for example when the record carrier is changed. However, when in such an apparatus the indicator has reached its initial or final position after rewinding or unwinding the record carrier and therefore the index is obstructed. If the tape drive and the worm drive then remain switched-on, the parts of the worm drive are continuously disengaged and re-engaged by the joint action of driving force and spring force. This results in an annoying noise which is comparable to the ticking of a clock. Furthermore the parts are unnecessarily loaded and tend to wear out.

The undesirable phenomenon is completely suppressed by the present invention with the simplest means. According to the invention at least one pivotally arranged lock is provided for retaining the first part of the worm drive in its uncoupled position when movement of the index is obstructed. The lock is connected through a slip coupling to a shaft rotating with the record carrier and has a rotational range which is limited in two directions by stops one of which is arranged on the said first part.

In a further embodiment of the invention the lock is connected to a disk which is rotatably mounted on the shaft of the worm and slidable in the axial direction of the worm. This first disk is pushed against a second disk fixedly arranged on the shaft of the worm by means of a spring. In the simplest manner the disk which is rotatable on the shaft of the worm and slidable along its axis is provided at its periphery with a cam which serves as a lock and, at least in one direction, as a limiter of the rotational range of the disk.

It is preferable to provide two rotary locks which are actuated into their locking positions relative to the first part of the worm drive by opposite directions of rotation of the shaft rotating with the record carrier. The two rotary locks are advantageously formed by two cams on the periphery of the disk which is rotatable on the shaft of the worm and slidable in its axial direction. The stop on the first part of the worm drive is arranged in one interspace which remains between the cams a fixed stop in the apparatus is arranged in the other interspace.

In order that the invention may be readily carried into effect, several embodiments thereof will now be described in detail by way of example, with reference to the accompanying diagrammatic drawings.

FIGURE 1 shows, in part diagrammatically, an indicating mechanism having a rectilinear scale in which the index is moved by means of a slidably arranged worm driven by the record carrier and co-acting with a pivotable toothed rod.

FIGURES 2*a* and 2*b* show the rotary lock used in this mechanism in two different functional positions in the form of sections of FIGURE 1 taken on the plane II—II.

FIGURE 3 shows a counting mechanism having a rectilinear scale in which a segment of a nut guided on a pivotally supported rail and serving to drive the index engages in a screw spindle set into rotation by the record carrier.

FIGURE 4 is a sectional view of the mechanism of FIGURE 3, according to line IV—IV.

FIGURES 5*a* and 5*b* are sectional views of the mechanism of FIGURE 3 according to line V—V, in which the lock used is shown in two functional positions.

Figure 6:
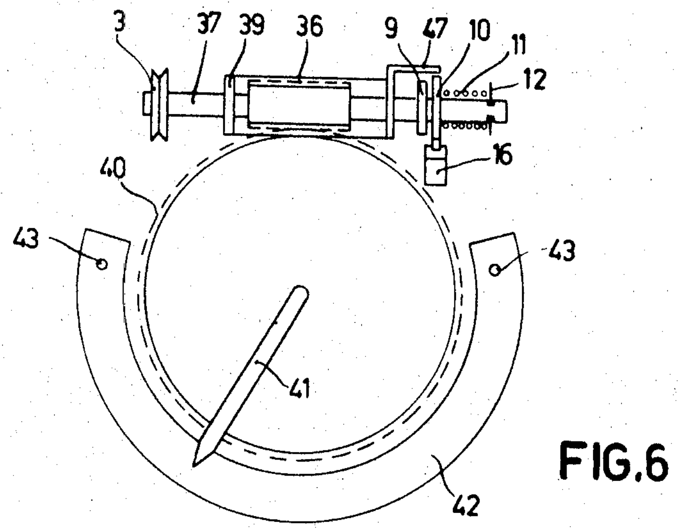

FIGURE 6 shows a counting mechanism having a circular scale in which a pivotally supported worm driven by the record carrier drives the index through a gear wheel. Two locks are provided which reach their locking positions at opposite extremes of rotation of the worm.

Figure 7A:
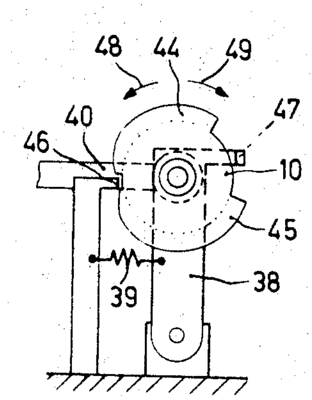
Figure 7B:
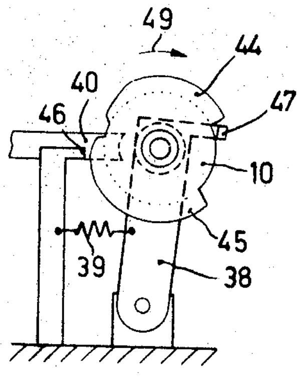
Figure 7C:
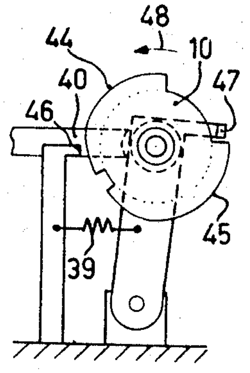

FIGURES 7*a*, 7*b* and 7*c* show three different functional positions of the locks used in the mechanism of FIGURE 6.

In the embodiment of FIGURE 1 a shaft 1 is supported for rotational movement only, in bearings 2. It is driven by means of a pulley 3 fitted on it and by means of a belt from a pulley (not shown) rotating with the record carrier. A worm 4 from which an index 5 is suspended by means of a bifurcated element can slide on the shaft 1 in the axial direction. In order that the worm 4 follows the rotation of the shaft 1 it has a prismatic cross-section along the slide path of the worm 4. By the action of a spring 6 the worm 4 and a gear rod 7 engage each other, said gear rod 7 being pivotable about an axis 8 away from the worm 4 (FIGURES 2*a* and 2*b*). Further a disk 9 is fixedly secured to the shaft 1. Another disk 10 is arranged on the shaft 1 to rotate and to slide axially on said shaft. The disk 10 is pushed against the disk 9 by means of a compression spring 11 secured to a locking member 12 placed in a groove of the shaft 1. The two discs are thus connected together through a slip coupling.

When in the mechanism just described, the displacement of the worm 4 along the rotary shaft 1 is obstructed when the index abuts the end of the scale. If the drive of the worm 4 is not switched-off, the teeth of the gear rod 7 slide up on the inclined faces of the worm thread, thus lifting the gear rod. Upon reaching the crests between the thread spirals the teeth fall back into the worm thread by the action of spring 6, resulting in the ticking noise previously referred to due to the continuous repetition of the engagement and disengagement of the worm 4 and the gear rod 7.

In FIGURES 1, 2*a*, and 2*b* it is assumed that in the device described the worm 4 moves with the index 5 from the right to the left on rewinding the record carrier, the shaft 1 thus rotating in the direction indicated by arrow 15 (FIGURES 2*a*, 2*b*).

In order to retain the gear rod 7 in the released position which it will occupy when the index 5 is obstructed, the disk 10 is provided with a cam 13 at its periphery. The gear rod 7 has an edge 14 which lies in the moving area of the cam as long as the gear rod 7 engages the worm 4. When the disk 10 is rotated in the direction indicated by arrow 15 the cam 13 abuts the edge or hook 14. When the gear rod 7 is lifted the cam 13 can slip under the lifted edge 15. For the disk 10 to remain in this position even though it is driven further in the direction indicated by the arrow, a fixed stop 16 is arranged in the moving area of the cam 13. The height of the edge 17 of the cam which lies in the direction indicated by arrow 15 is chosen to be a little smaller, and the height of the edge 18 of the cam which eventually comes to lie under the edge 14 of the gear rod, is chosen to be a little greater, than the stroke occurring on the edge 14 when the worm 4 is obstrutced.

The disengagement of the worm 4 and the gear rod 7 is maintained until the direction of rotation of the shaft 1 is reversed (arrow 19) and hence when the forward movement of the record carrier is switched-on again. The disk 10 is driven by the disk 9 through the slip coupling. The cam 13 releases the gear rod 7 and the engagement with the worm 4 is re-established by the action of spring 6. However, the disk 10 follows the rotation of the shaft 1 only until the edge 20 of the cam engages the stop 16.

In the embodiment of FIGURES 3 to 5*b* the worm drive comprises a threaded segment 22, provided with an index 21, and a screw spindle 23. The latter is driven, as before, by means of a pulley 3 fixed on it and by means of a belt from a pulley (not shown) rotating with the record carrier. The carrier 24 for the segment 22 which is slidably supported on a guide rail 25 may thus be displaced. The threaded segment 22 is coupled to the screw spindle 23 by means of two pull springs 28 engaging lateral arms 26 of the guide rail 25 pivotable about an axis 27. The cylindrical extremity 29 of screw spindle 23 has secured to it a disk 9 which froms a slip coupling, by the action of compression spring 11, with a lock 30 arranged in situ to pivot on the extremity 29 and to slide along it in its axial direction. FIGURE 5*a* shows the lock 30 in the final position determined by a stop 31, which it occupies when the screw spindle 23 has been driven in the direction indicated by arrow 32. When the screw spindle 23 is subsequently driven in the direction indicated by arrow 33 it takes along the lock 30 until its arm is obstructed in rotating further by an edge 34 of the guide rail 25. From this moment onwards the coupling slips. The rotation of screw spindle 23 in the direction indicated by arrow 32 should correspond to the unwinding of the record carrier and the rotation in the direction indicated by arrow 33 should correspond to the rewinding of the record carrier and hence to the return of the index 21 to its initial position. In this initial position the threaded segment 22 is prevented from sliding further by the action of the drive from the screw spindle 23 by means of a change in cross-section of the guide rail 25. When the screw spindle 23 is driven further the threaded segment 22 deviates along the flanks of the thread of the screw spindle 23 in a direction transverse thereof, causing the guide rail 25 to swing about the axis 27. Consequently the upper edge 34 of the guide rail 25 comes to lie under a recess 35 of the lock 30. Due to the action of the slip coupling the lock 30 can now be rotated further, the edge 34 of guide rail 25 then lies inside the recess 35 and the guide rail 25 is obstructed in returning to its initial position (FIGURE 5*b*). The gearing of the driven screw spindle 23 no longer meshes with the gearing of the threaded segment 22. Only when the screw spindle 23 is driven again in the opposite direction (arrow 32) is the lock 30 rotated by the slip coupling from its position locking the guide rail 25. The rotation continues until the lock 30 again engages the stop 31.

In the embodiment of FIGURE 6 and FIGURES 7*a*, *b*, *c* a worm 36 is fixedly arranged on a shaft 37 which, as before, is driven through a pulley 3 by means of a belt drive (not shown). The belt is operative during the movement of the record carrier. The shaft 37 is supported in a pivotable bifurcated element 38. The worm 36 engages in a gear disk 40 by the action of a spring 39. An index 41 moves in front of a circular scale 42 and is secured to the shaft of the gear disk 40. Two stops 43 limit the path of the index. The shaft 37 also carries a disk 9. A disk 10 rotatable about the shaft 37 and slidable on it in the axial direction is pushed against the disk 9 for establishing a slip coupling therewith through a compression spring 11. The spring 11 is secured to a locking member 12 placed in a groove of the shaft 37. The periphery of the disk 10 is formed with two cams 44 and 45 which co-act with a stop 46 fixedly arranged between them in the device. The bifurcated element 38 has a lug 47 which serves as a stop for the cams 44 and 45. As long as the worm 36 and the gear disk 40 are in engagement the stop 46 lies in a detent between the two cams 44 and 45 (FIGURE 7*a*). When the index 41 reaches one of its two final positions given by the stops 43, the thread of the worm 36 rises out of the teeth of the gear disk 40, thus causing the bifurcated element 38 to be pivoted, and either the cam 44 or 45 dependent upon whether the shaft 37 rotates in the direction indicated by arrow 48 or 49 moves in front of the stop 46. The rotational movement of the disk 10 at the same time is stopped due to the cam 45 or 44 engaging the lug 47 of the bifurcated element 38 (FIGURES 7*b*, 7*c*). When, with the worm 36 disengaged, the direction of rotation of the shaft 37 reverses and the stop 46 thus comes again within the area between the cams 44 and 45, the coupling between the worm 36 and the gear disk 40 is re-established by the action of spring 39.

What is claimed is:

1. In a tape recorder of the type having a driven index, the combination comprising an axially rotatable shaft for driving the index, a worm drive connected intermediate said shaft and said index, said worm drive having a worm member and a gear member meshing with the worm member, spring means connected to said worm drive for urging said worm member and said gear member into meshing engagement, a slip coupling driven by said shaft, and means driven by said slip coupling in response to obstruction of said index for locking said worm member and said gear member into a disengaged position.

2. Apparatus as claimed in claim 1 therein said slip coupling comprises a first disk rotatably and slidably mounted on said shaft adjacent said lock, a second disk affixed to said shaft abutting said first disk, and means for biassing said first disk against said second disk.

3. Apparatus as claimed in claim 2 wherein said worm member is slidably mounted on said shaft for rotation therewith, wherein said gear member comprises a toothed bar, pivotable from a first position in which said gear member engages said worm member to a second position in which said gear member is disengaged from said worm member, and wherein said locking means comprises a cam on the periphery of said first disk extending radially outward from said shaft and having a raised portion and an edge portion, means comprising a hook extending from said gear member toward said first disk and engaging said edge portion of said cam in response to rotation of said shaft during unrestricted operation of said index and engaging said raised portion of said cam in response to obstruction of said index for retaining said gear member in a position spaced from said worm member in response to obstruction of said index.

4. Apparatus as claimed in claim 2, further comprising a pivotally mounted elongated guide rail disposed parallel to said worm member and having a pivotal axis spaced from the major axis of said rail, wherein said worm member is rigidly affixed to said shaft, wherein said index is mounted on said gear member, wherein said gear member is slidably mounted on said guide rail, said rail pivotable from a first position wherein said gear member meshes with said worm member to a second position wherein said gear member is disengaged from said worm member, and wherein said locking means comprises a finger extending radially from said first disk and having a notch and an end thereof for retaining said guide rail in said second position within said notch in response to obstruction of said index.

5. Apparatus as claimed in claim 2, wherein said worm member is rigidly affixed to said shaft, wherein said gear member is substantially round, wherein said index is affixed to said gear member, further comprising an arm rotatably mounted on said shaft and pivotally mounted for rotation about an axis from said shaft to a first position wherein said worm member meshes with said gear member and to a second position wherein said worm member is disengaged from said gear member, and wherein said locking means comprises a pair of spaced cams projecting radially from said first disk and forming a detent therebetween, and means comprising a rigid pawl extending into said detent during unobstructed operation of said index and abutting a projecting portion of said cams in response to obstruction of said index for maintaining said arm in said second position.

References Cited

UNITED STATES PATENTS

| | | | |
|---|---|---|---|
| 2,451,084 | 10/1948 | Hennessy | 235—91 |
| 2,944,750 | 7/1960 | Hall | 235—103 XR |
| 3,039,777 | 6/1962 | Trost | 274—17 |

STEPHEN J. TOMSKY, *Primary Examiner.*

U.S. Cl. X.R.

235—103